(12) United States Patent
Wang et al.

(10) Patent No.: US 8,907,029 B2
(45) Date of Patent: Dec. 9, 2014

(54) CATALYST FOR HIGH TEMPERATURE OLEFIN POLYMERIZATION

(75) Inventors: Qinyan Wang, Calgary (CA); Peter Zoricak, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 51 days.

(21) Appl. No.: 13/582,290

(22) PCT Filed: Mar. 8, 2011

(86) PCT No.: PCT/CA2011/000248
§ 371 (c)(1),
(2), (4) Date: Aug. 31, 2012

(87) PCT Pub. No.: WO2011/116455
PCT Pub. Date: Sep. 29, 2011

(65) Prior Publication Data
US 2013/0012672 A1   Jan. 10, 2013

(30) Foreign Application Priority Data

Mar. 26, 2010   (CA) .................................... 2699832

(51) Int. Cl.
| | | |
|---|---|---|
| C08F 4/654 | (2006.01) | |
| C08F 4/16 | (2006.01) | |
| C08F 10/00 | (2006.01) | |
| C08F 210/16 | (2006.01) | |

(52) U.S. Cl.
CPC ............. *C08F 10/00* (2013.01); *C08F 210/16* (2013.01)
USPC .......................... 526/123.1; 502/226; 502/104

(58) Field of Classification Search
CPC ........ C08F 10/00; C08F 4/65912; C07F 3/02; B01J 21/00
See application file for complete search history.

(56) References Cited

U.S. PATENT DOCUMENTS

| | | |
|---|---|---|
| 4,127,507 A | 11/1978 | Fannin et al. |
| 4,250,288 A | 2/1981 | Lowery, Jr. et al. |
| 4,490,475 A | 12/1984 | Bailly et al. |
| 4,497,904 A | 2/1985 | Blaya et al. |
| 4,612,300 A | 9/1986 | Coleman, III |
| 5,106,805 A | 4/1992 | Bailly et al. |
| 5,589,555 A | 12/1996 | Zboril et al. |
| 6,031,056 A | 2/2000 | Friederichs et al. |
| 6,174,971 B1 | 1/2001 | Chen et al. |
| 6,723,677 B1 | 4/2004 | Estrada et al. |
| 7,666,810 B2 | 2/2010 | Wang et al. |

OTHER PUBLICATIONS

Greenwood, Chemistry of the Elements, 1998, Butterworth Heinemann, 2nd ed., p. 139.*
ASTM D1238-10—Standard Test Method for Melt Flow Rates of Thermoplastics by Extrusion Plastometer—pp. 1-15.
ASTM D 1928-96—Standard Practice for Preparation of Compression-Molded Polyethylene Test Sheets and Test Speciments—pp. 1-7.
ASTM E878-11—Standard Test Method for Determination of Titanium in Iron Ores and Related Materials by Diantipyrylmethand Ultraviolet Spectrometry—pp. 1-4.
Skoog, D. A. and West, D. M., "Precipitation Titrations", Fundamentals of Analytical Chemistry, 4th Ed., CBS College Publishing, New York, 1982, Chapter 7, pp. 178-194.
Skoog, D.A. and West, D. M., Complex Formation Titrations:, Fundamentals of Analytical Chemistry, 4th Ed., CBS College Publishing, New York, 1982, Chapter 12, pp. 276-303.
Chien, James C. W., Weber, Siegfried and Hu, Youliang, Magnesium Chloride Supported Catalysts for Olefin Polymerization. XIX. Titanium Oxidation States, Catalyst Deactivation, and Active Site Structure, Journal of Polymer Science: Part A: Polymer Chemistry, vol. 27, pp. 1499-1514 (1989).

* cited by examiner

*Primary Examiner* — Ling Choi
*Assistant Examiner* — Catherine S Branch
(74) *Attorney, Agent, or Firm* — Lawrence T. Kale

(57) ABSTRACT

An olefin polymerization catalyst is prepared by (a) in a diluent, combining a diorganomagnesium compound with less than 2 molar equivalents of a first source of chloride to produce a "chloride deficient" magnesium chloride support; (b) without isolating any solids, adding a second source of chloride which reduces the amount of soluble un-reacted diorganomagnesium compound present; (c) without isolating any solids present, adding a tetravalent titanium species and; (d) adding an activator. The catalyst is active for solution polymerization of olefins.

27 Claims, No Drawings

US 8,907,029 B2

CATALYST FOR HIGH TEMPERATURE OLEFIN POLYMERIZATION

REFERENCE TO RELATED APPLICATION

This application is the U.S. national phase of International Application No. PCT/CA2011/000248 filed on Mar. 8, 2011 which designated the U.S. and claims priority to Canadian Application No. 2,699,832 which was filed on Mar. 26, 2010, the entire contents of each of which are hereby incorporated by reference.

TECHNICAL FIELD

The present invention relates to olefin polymerization catalysts and olefin polymerization processes, especially solution phase polymerization catalysts and processes.

BACKGROUND ART

Magnesium chloride supported Ziegler-Matta catalysts are well known in the art. Typically, the magnesium chloride support is prepared by reacting an excess of chloride anion with a dialkylmagnesium compound, so as to provide a magnesium chloride support material which has relatively little or substantially no alkylmagnesium bonds present prior to addition of an active metal species, such as a titanium compound. The use of such catalysts in the polymerization of olefins is discussed, for example, in U.S. Pat. Nos. 4,612,300 and 5,106,805.

For some catalyst preparations a magnesium chloride support is made with a small deficiency in chloride ion. For example U.S. Pat. No. 4,490,475 teaches that in order to generate magnesium chloride support material with pendant Mg—R functionality, the molar ratio in a reaction between an alkyl halide and a dialkylmagnesium should be from 1.85 to 1.95. U.S. Pat. No. 4,497,904 teaches that addition of a reduced titanium species to a magnesium chloride support which has small amounts of alkylmagnesium bonds provides an active ethylene polymerization catalyst. In each of these patents, formation of a "chloride deficient" magnesium chloride support is carried out in the presence of an electron donor such as an oxygen, sulfur, nitrogen or phosphorus compound.

U.S. Pat. No. 4,250,288 discusses the formation of an olefin polymerization catalyst by combining a dialkylmagnesium compound, a source of chloride ion and a tetravalent titanium compound. A broad atomic ratio of magnesium to chloride is claimed for the final catalyst formulation (i.e. from 0.1:1 to 1:1) and with regard to intermediate support formation, the patent teaches that chloride ion is preferably added in amounts which convert all dialkylmagnesium compounds into hydrocarbon insoluble magnesium species.

When making magnesium chloride supports by treating dialkylmagnesium compounds with less than 2 molar equivalents of chloride ion, the presence of un-reacted dialkylmagnesium compound is expected.

In U.S. Pat. No. 7,666,810 it was shown that the presence of dialkylmagnesium species, in mixtures used to prepare magnesium chloride supported Ziegler-Natta catalysts, has a negative impact on catalyst performance. In order to prepare highly active catalysts for high temperature olefin polymerization, a filtration/washing step was used to remove un-reacted dialkylmagnesium species. Although filtration and washing steps are effective, they are time consuming and add cost to the catalyst preparation procedure. Perhaps even more importantly, filtration and washing steps are not a viable option for in-line catalyst preparative methods.

In light of the above, an alternative method which provides a magnesium chloride support which is deficient in chloride and which reduces the amount of un-reacted dialkylmagnesium available to negatively impact catalyst performance would be very useful. It would be especially useful if such a method was compatible with in-line catalyst preparation and delivery procedures. In line methods to prepare a Ziegler-Natta catalyst are taught in, for example, U.S. Pat. No. 6,723,677.

Also useful would be a support and catalyst composition which does not require electron donor compounds to be effective, since electron donor compounds add procedural steps and increase catalyst cost.

DISCLOSURE OF INVENTION

We have now discovered that a filtration step can be avoided altogether by adding a chloride source to diorganomagnesium in two distinct addition steps (e.g. a split chloride addition method). In a first chloride addition, a "chloride deficient" $MgCl_2$ is formed as a solid in a suitable diluent by adding a sub-stoichiometric amount of chloride ion to a diorganomagnesium compound. In a second addition, chloride ion is added and reacts mainly with un-reacted diorganomagnesium remaining in solution after $MgCl_2$ formation during the first step. Addition of an active metal species and an activator completes the catalyst. The new method provides high activity Ziegler-Natta catalysts which can be used directly and without isolation of catalysts components. Hence, filtration steps are no longer required to reduce the presence of diorganomagnesium contaminants. In addition, the new method is particularly well suited for in-line applications where catalyst components are combined on route to a polymerization reactor and where catalyst component isolation steps are completely avoided.

Accordingly, the present invention provides an olefin polymerization catalyst which is prepared by: (a) in a diluent, combining a diorganomagnesium compound with less than 2 molar equivalents of chloride provided by a first source of chloride to produce a "chloride deficient" magnesium chloride support; (b) without isolating any solids, adding a second source of chloride which reduces the amount of soluble un-reacted diorganomagnesium compound present; (c) without isolating any solids present, adding a tetravalent titanium species and; (d) adding an activator.

In an embodiment, the present invention provides a process to prepare an olefin polymerization catalyst, the process comprising: (a) in a diluent, combining a diorganomagnesium compound of the formula $MgR_aR_b$ with a first source of chloride to give a first product mixture, wherein the molar ratio of chloride in the first source of chloride to magnesium Mg is from 1.5:1 to 1.95:1 and where $R_a$ and $R_b$ are individually $C_1$ to $C_8$ hydrocarbyl groups; (b) without isolating any solids present in the first product mixture, combining the first product mixture with a second source of chloride to give a second product mixture, wherein the molar ratio of chloride in the second source of chloride to total magnesium Mg is from 0.01:1 to 0.75:1, wherein the total molar ratio of chloride from the first source of chloride and from the second source of chloride to magnesium Mg does not exceed a ratio of 2.3:1; (c) without isolating any solids present in the second product mixture, combining the second product mixture with a titanium species to give a third product mixture, the titanium species having the formula $TiCl_n(OR)_m$, wherein n is from 2 to 4, n+m=4 and OR is selected from an alkoxy group, an aryloxy group, or mixtures thereof; and (d) i) combining the third product mixture with an activator; or ii) combining solids isolated from the third product mixture with an activator.

In an embodiment, the present invention provides an olefin polymerization process comprising contacting one or more olefins with an olefin polymerization catalyst prepared according to a process comprising: (a) in a diluent, combining a diorganomagnesium compound of the formula MgRaRb with a first source of chloride to give a first product mixture, wherein the molar ratio of chloride in the first source of chloride to magnesium Mg is from 1.5:1 to 1.95:1 and where Ra and Rb are individually $C_1$ to $C_8$ hydrocarbyl groups; (b) without isolating any solids present in the first product mixture, combining the first product mixture with a second source of chloride to give a second product mixture, wherein the second source of chloride reduces the amount of soluble un-reacted diorganomagnesium compound present in the first product mixture by reacting therewith; provided that the total molar ratio of chloride from the first source of chloride and from the second source of chloride to magnesium Mg does not exceed a ratio of 2.2:1; (c) without isolating any solids present in the second product mixture, combining the second product mixture with a titanium species to give a third product mixture, the titanium species having the formula $TiCl_n(OR)_m$, wherein n is from 2 to 4, n+m=4 and OR is selected from an alkoxy group, an aryloxy group, or mixtures thereof; and (d) i) combining the third product mixture with an activator; or ii) combining solids isolated from the third product mixture with an activator.

A solution phase polymerization process catalyzed by an olefin polymerization catalyst is also provided wherein, the catalyst is prepared in-line by a process comprising: (a) forming a first product mixture by combining a diorganomagnesium compound and a first source of chloride, in a diluent, wherein the molar ratio of chloride in the first source of chloride to the diorganomagnesium compound is from 1.5:1 to 1.95:1; (b) forming a second product mixture by combining the first product mixture with a second source of chloride, wherein the molar ratio of chloride in the second source of chloride to the diorganomagnesium compound is from 0.01:1 to 0.75:1; provided that the total molar ratio of chloride from the first source of chloride and from the second source of chloride to magnesium Mg does not exceed a ratio of 2.3:1; (c) forming a third product mixture by combining the second product mixture with a titanium species of the formula $TiCl_n(OR)_m$, wherein n is from 2 to 4, n+m=4 and OR is selected from an alkoxy group, an aryloxy group, or mixtures thereof; (d) combining the third product mixture with an activator.

Also provided is a process to prepare an olefin polymerization catalyst, the process comprising: (a) forming a solid product by combining in a diluent, a diorganomagnesium compound of the formula MgRaRb with a source of chloride wherein the molar ratio of chloride provided by the source of chloride to magnesium Mg is from 1.55:1 to 2.3:1, and where Ra and Rb are individually $C_1$ to $C_8$ hydrocarbyl groups; wherein i) from 70 to 99.5 mol % of the source of chloride is combined with MgRaRb in a first contacting stage and ii) the balance of the source of chloride is combined with MgRaRb in a second contacting stage; provided that the molar ratio of chloride provided by the source of chloride to magnesium Mg in the first contacting stage does not exceed 2:1; (b) without isolating the solid product, adding a titanium species, the titanium species having the formula $TiCl_n(OR)_m$, wherein n is from 2 to 4, n+m=4 and OR is selected from an alkoxy group, an aryloxy group, or mixtures thereof; and (c) adding an activator.

In an embodiment of the invention, the process to prepare an olefin polymerization catalyst is an in-line process.

In an embodiment of the invention, the process to prepare an olefin polymerization catalyst is an off-line process.

BEST MODE FOR CARRYING OUT THE INVENTION

The present invention provides a process for making an olefin polymerization catalyst and a polymerization processes employing it. The catalysts comprise a magnesium chloride support with pendant alkylmagnesium bonds, a titanium component and an activator. The catalyst is made in a sequential fashion and involves the stepwise formation of a magnesium chloride support from the reaction of a diorganomagnesium compound with a first and then a second source of chloride ion (i.e. a split addition of chloride ion).

By "chloride deficient magnesium chloride" it is meant that the magnesium chloride is made by adding less than a stoichiometric amount of chloride (i.e. less than a 2:1 molar ratio) to a diorganomagnesium compound, and where the magnesium chloride support is expected to have Mg—R (i.e. alkylmagnesium or organomagnesium) moieties present.

The diorganomagnesium compound may be a dihydrocarbylmagnesium such as dialkylmagnesium or diarylmagnesium. Dialkylmagnesium compounds are preferred. In an embodiment of the invention, a diorganomagnesium compound has the general formula MgRaRb where Ra and Rb are each independently selected from $C_1$ to $C_{20}$ hydrocarbyl groups. In another embodiment of the invention, a diorganomagnesium compound has the general formula MgRaRb where Ra and Rb are each independently selected from $C_1$ to $C_8$ hydrocarbyl groups.

Suitable dialkylmagnesium compounds include dibutylmagnesium, diisopropylmagnesium, dihexylmagnesium, diethylmagnesium, propylbutylmagnesium, butylethylmagnesium and other compounds having the general formula MgRaRb where Ra and Rb are each independently selected from $C_1$ to $C_8$ linear or branched alkyl groups.

Diarylmagnesium compounds include for example diphenylmagnesium, and ditolylmagnesium.

Diorganomagnesium compounds having alkylaryl groups are also contemplated for use with the current invention and include for example dibenzylmagnesium.

In cases where the diorganomagnesium compound is not readily soluble in the diluents of choice for the catalyst preparation, it may be desirable to add a solubilizing compound such as an organoaluminum or organozinc compound prior to use. Such compounds are discussed in, for example, U.S. Pat. Nos. 4,127,507 and 4,250,288. Alternatively, where diorganomagnesium compounds provide solutions which are overly viscous in diluents of choice, solubilizers such as organoaluminum or organozinc may be used to decrease the viscosity of the solution.

The diorganomagnesium compounds used in the present invention have preferably been treated with a solubilizing agent (or viscosity improving agent) and are formulated as solutions in a suitable hydrocarbon solvent. Such solutions are commercially available from suppliers such as Albermarle, Akzo Nobel, etc. For example, diorganomagnesium compounds available in hydrocarbon solution include solutions of butylethylmagnesium or dibutylmagnesium which have been treated with an organoaluminum compound to improve solubility and/or reduce solution viscosity.

The present invention provides a two step or split addition of chloride ion to a diorganomagnesium compound for making a magnesium chloride support. A two step or split addition process according to the present invention provides a magnesium chloride support having a reduced amount of un-reacted diorganomagnesium and which is preferably deficient in chloride.

In the broadest sense of the invention, the amount of chloride added during each distinct addition step (for example a Step 1 and a Step 2) is not specifically defined so long as the amount of chloride ion provided in the first addition step is such that the ratio of chloride to diorganomagnesium is less than 2:1, and the total amount of chloride ion added over the two steps does not exceed a molar ratio of chloride to diorganomagnesium of about 2.3:1.

The present invention can be used to prepare olefin polymerization catalysts in-line or off-line.

In an embodiment, the total amount of chloride added to a diorganomagnesium over two steps or in a split addition is added in a molar ratio of chloride to diorganomagnesium of about 1.5:1 to 2.3:1. In another embodiment, the total amount of chloride added to a diorganomagnesium over two steps or in a split addition is added in a molar ratio of chloride to diorganomagnesium of about 1.55:1 to 2.3:1. In yet another embodiment, the total amount of chloride added to a diorganomagnesium over two steps or in a split addition is added in a molar ratio of chloride to diorganomagnesium of about 1.55:1 to 2.2:1. In still another embodiment, the total amount of chloride added to a diorganomagnesium over two steps or in a split addition is added in a molar ratio of chloride to diorganomagnesium of about 1.6:1 to 2.2:1. In still yet another embodiment, the total amount of chloride added to a diorganomagnesium over two steps or in a split addition is added in a molar ratio of chloride to diorganomagnesium of about 1.65:1 to 2.1:1. In a further embodiment, the total amount of chloride added to a diorganomagnesium over two steps or in a split addition is added in a molar ratio of chloride to diorganomagnesium of about 1.65:1 to 2.05:1.

In an embodiment, the total amount of chloride added to a diorganomagnesium over two steps or in a split addition is added in a molar ratio of chloride to diorganomagnesium which does not exceed about 2.3:1. In another embodiment, the total amount of chloride added to a diorganomagnesium over two steps or in a split addition is added in a molar ratio of chloride to diorganomagnesium which does not exceed 2.25:1. In yet another embodiment, the total amount of chloride added to a diorganomagnesium over two steps or in a split addition is added in a molar ratio of chloride to diorganomagnesium which does not exceed about 2.2:1. In still yet another embodiment, the total amount of chloride added to a diorganomagnesium over two steps or in a split addition is added in a molar ratio of chloride to diorganomagnesium which does not exceed about 2.1:1. In a further embodiment, the total amount of chloride added to a diorganomagnesium over two steps or in a split addition is added in a molar ratio of chloride to diorganomagnesium which does not exceed about 2.05:1.

In the present invention, it is preferable to form a magnesium chloride support in which the molar ratio of chloride to magnesium in the support is below 2 (i.e. a "chloride deficient" support), even where the total molar ratio of chloride to magnesium added over two steps is above 2:1.

In the present invention, it is preferable to form a magnesium chloride support in which the molar ratio of chloride to magnesium in the support is below 2 (i.e. a "chloride deficient" support), and which has not been treated by electron donor compounds.

The magnesium chloride supports formed in the present invention are used directly, and without isolation, in the formation of an olefin polymerization catalyst by the addition of a tetravalent titanium species and an activator (i.e. a co-catalyst).

In the present invention the polymerization catalyst is formed by carrying out, sequentially the following four steps.

Step 1:

In a suitable diluent or solvent (suitable diluents/solvents are described below) a first source of chloride ion is reacted with a diorganomagnesium compound (described as above). In the first step, it is essential that the molar ratio of chloride provided by the first source of chloride to diorganomagnesium (or magnesium Mg) is less than 2:1, so that a magnesium chloride product (i.e. $MgCl_2$) deficient in chloride is formed. This provides a first product mixture generally comprising: diluent, precipitated solids such as insoluble magnesium chloride, insoluble Grignard reagents, and un-reacted soluble diorganomagnesium species. "Grignard" reagents or species formed in the present invention have their conventional definition and may be generally described as alkylchloromagnesium compounds and have both Mg—Cl and Mg-hydrocarbon bonds.

Step 1 may be considered a "first contacting stage", where at least a portion of the total amount of a chloride ion (from a source of chloride) to be added to a diorganomagnesium compound is added, provided that the amount of chloride added in the first contacting stage provides a molar ratio of chloride to diorganomagnesium of less than 2:1.

In an embodiment of the invention, Step 1 may be considered a "first contacting stage", where from 60-99.5 mol % of the total amount of a chloride ion to be added to a diorganomagnesium compound is added, provided that the amount of chloride added in the first contacting stage provides a molar ratio of chloride to diorganomagnesium of less than 2:1. In another embodiment of the invention, Step 1 may be considered a "first contacting stage", where from 70-99.5 mol % of the total amount of a chloride ion to be added to a diorganomagnesium compound is added, provided that the amount of chloride added in the first contacting stage provides a molar ratio of chloride to diorganomagnesium of less than 2:1. In yet another embodiment of the invention, Step 1 may be considered a "first contacting stage", where from 70-95 mol % of the total amount of a chloride ion to be added to a diorganomagnesium compound is added, provided that the amount of chloride added in the first contacting stage provides a molar ratio of chloride to diorganomagnesium of less than 2:1. In still yet another embodiment of the invention, Step 1 may be considered a "first contacting stage", where from 75-90 mol % of the total amount of a chloride ion to be added to a diorganomagnesium compound is added, provided that the amount of chloride added in the first contacting stage provides a molar ratio of chloride to diorganomagnesium of less than 2:1.

Without wishing to be bound by theory, the formation of a Grignard and the incomplete reaction of the diorganomagnesium compound is due to the use of less than 2 molar equivalents of chloride for each mole of diorganomagnesium compound. Useful diluents for use in Step 1, include inert hydrocarbon solvents in which the diorganomagnesium and source of chloride are soluble and in which the product magnesium chloride is not, and in which the Grignard compounds formed are at least partially insoluble. Hence, in the present invention, solids present in the first product mixture comprise a majority of $MgCl_2$ species and a minority of species selected from Grignard species of the type $MgClR_a$ and $MgClR_b$ (assuming a diorganomagnesium reactant of the type $MgR_aR_b$).

In an embodiment of the invention the molar ratio of chloride provided by the first source of chloride to diorganomagnesium is from about 1.5:1 to about 1.95:1. In another embodiment, the molar ratio of chloride provided by the first source of chloride to diorganomagnesium is from about 1.6:1 to about 1.95:1. In yet another embodiment, the molar ratio of chloride provided by the first source of chloride to diorganomagnesium is from about 1.65:1 to about 1.95:1. In still another embodiment, the molar ratio of chloride provided by the first source of chloride to diorganomagnesium is from about 1.65:1 to about 1.9:1. In still yet another embodiment, the molar ratio of chloride provided by the first source of chloride to diorganomagnesium is from about 1.65:1 to about 1.85:1.

Preferably, the entire amount of diorganomagnesium compound to be used in the catalyst preparation of the present invention is present during Step 1 (i.e. first contacting stage).

The first source of chloride ion is not specifically defined and can be any suitable chloride source compound, which is capable of providing an active (i.e. reactive) chloride ion for reaction with an organomagnesium bond. Preferably the chloride source will react spontaneously and fully with the diorganomagnesium compound, but a chloride source which requires a transfer agent such as described in U.S. Pat. No. 6,031,056 is also contemplated for use with the current invention.

In an embodiment, the first source of chloride will be a non-metallic chloride compound. Convenient chloride sources include, for example, HCl or tert-butyl chloride.

In an embodiment of the invention, the first source of chloride will be an organic chloride compound such as, for example, an alkyl chloride having the formula R*Cl, wherein R* is a $C_1$ to $C_8$ alkyl group.

Generally, both the first source of chloride and the diorganomagnesium compounds will each be combined as solutions in a suitable diluent or solvent such as an inert hydrocarbon.

The first source of chloride may be added to the diorganomagnesium compound or the diorganomagnesium compound may be added to the first source of chloride. Alternatively, the first source of chloride and the diorganomagnesium compound may be added to a suitable reaction solvent simultaneously. The first source of chloride may be added as a neat liquid, a gas or a solid, but is conveniently added as a solution or slurry in a suitable diluent or solvent.

In an embodiment of the invention, the diorganomagnesium compound is added to the first source of chloride.

The first source of chloride and the diorganomagnesium compound may be added with or without stirring. For example, they may be combined in a stirred reactor tank or they may combined by flowing one solution into another under continuous flow conditions as for example in a catalyst feed line or reaction tree having an inlet for each of the first source of chloride and the diorganomagnesium compound.

The reaction temperatures used in the first step are not specifically defined, but reaction temperatures of from about 30° C. to about 80° C. degrees are useful.

The first product mixture obtained in Step 1 is used without isolation of any solids present. The first product mixture is used directly for Step 2.

In an embodiment of the invention, Step 1 is carried out in-line and upstream of a polymerization zone.

Step 2:

The product mixture of Step 1 is combined with a second source of chloride ion to give a second product mixture.

Step 2 may be considered a "second contacting stage", where the balance of the total amount of a chloride ion (from a source of chloride) to be added to the diorganomagnesium compound is added.

Without wishing to be bound by theory, the chloride ion provided by the second source of chloride reacts mainly with the un-reacted diorganomagnesium species present in the first product mixture because the diorganomagnesium species is soluble in the diluent chosen for the catalyst preparation, while any Grignard reagent present exists mainly as a precipitate with the insoluble magnesium chloride. It is commonly understood by persons skilled in the art that reagents which are in solution react faster than solid reagents which are suspended in solution.

The second source of chloride ion is added in amounts sufficient to react with at least some (for example, at least about 0.5%) of the soluble un-reacted diorganomagnesium compound which remain in the first product mixture obtained in Step 1. Hence, the addition of the second source of chloride to the first product mixture reduces the amount of soluble un-reacted diorganomagnesium compound present to give a second product mixture having less diorganomagnesium than that in the first product mixture.

In an embodiment of the invention, the molar ratio of chloride ion provided by the second source of chloride to total magnesium present (i.e. the amount of diorganomagnesium used in Step 1) will be from about 0.005:1 to about 1:1. In another embodiment of the invention, the molar ratio of chloride ion provided by the second source of chloride to total magnesium present will be from about 0.01:1 to about 0.75:1. In still another embodiment of the invention, the molar ratio of chloride ion provided by the second source of chloride to total magnesium present will be from about 0.01:1 to about 0.7:1. In yet another embodiment of the invention, the molar ratio of chloride ion provided by the second source of chloride to total magnesium present will be from about 0.01:1 to about 0.5:1. In still yet another embodiment of the invention, the molar ratio of chloride ion provided by the second source of chloride to total magnesium present is from about 0.015:1 to about 0.4:1. In a further embodiment of the invention, the molar ratio of chloride ion provided by the second source of chloride to total magnesium present is from about 0.02:1 to about 0.3:1.

If the amount of soluble magnesium species in the first product mixture (e.g. un-reacted diorganomagnesium compound) is known or can determined (by for example, isolating a small amount of mother liquor from the first product mixture for analytical purposes), then in an embodiment of the invention, the chloride ion from the second source of chloride may be added in a molar ratio of chloride to soluble magnesium species of from about 0.03:1 to about 2.8:1. In another embodiment, the chloride ion from the second source of chloride may be added in a molar ratio of chloride to soluble magnesium species of from about 0.05:1 to about 2.7:1. In yet another embodiment, the chloride ion from the second source of chloride may be added in a molar ratio of chloride to soluble magnesium species of from about 0.1:1 to about 2.6:1. In still yet another embodiment, the chloride ion from the second source of chloride may be added in a molar ratio of chloride to soluble magnesium species of from about 0.15:1 to about 2.5:1.

The amount of soluble magnesium species present in the first product mixture and the second product mixture can be determined by isolating a small amount of mother liquor from the appropriate product mixture and subjecting it to Cl, Mg, and Al content analysis as described in the experimental section.

The second source of chloride ion is not specifically defined and can be any suitable chloride source compound, which is capable of providing an active (i.e. reactive) chloride ion for reaction with an organomagnesium bond. Preferably the chloride source will react spontaneously and fully with the diorganomagnesium compound, but a chloride source which requires a transfer agent such as described in U.S. Pat. No. 6,031,056 is also contemplated for use with the current invention.

In an embodiment, the second source of chloride will be a non-metallic chloride compound. Convenient chloride sources include, for example, HCl or tert-butyl chloride.

In an embodiment of the invention, the second source of chloride will be an organic chloride compound such as, for example, an alkyl chloride having the formula $R^*Cl$, wherein $R^*$ is a $C_1$ to $C_8$ alkyl group.

In a convenient embodiment of the invention the first source of chloride and the second source of chloride are the same compound.

The second source of chloride may be added to the first product mixture or the first product mixture may be added to the second source of chloride. Alternatively, the first product mixture and the second source of chloride may be added to a suitable reaction solvent simultaneously. The second source of chloride may be added as a neat liquid, a gas or a solid, but is conveniently added as a solution or slurry in a suitable diluent or solvent.

The reaction temperatures used in the second step are not specifically defined, but reaction temperatures of from about 30° C. to about 80° C. degrees are useful.

In an embodiment of the invention, the second source of chloride is added to the first product mixture.

The second product mixture obtained in Step 2 is used without isolation of any solids present. The second product mixture is used directly for Step 3.

In an embodiment of the invention, Step 2 is carried out in-line and upstream of a polymerization zone.

Step 3:

The second product mixture is combined with a tetravalent titanium species to provide a third product mixture. The tetravalent titanium species has the formula $TiX_n(OR^1)_m$, wherein n is from 2 to 4, n+m=4, X is a halide atom, and $R^1$ is a hydrocarbyl group which has from 1 to 20 carbon atoms. The $OR^1$ group taken as a whole may be selected from an alkoxy group, an aryloxy group, or mixtures thereof. Examples of some non-limiting $OR^1$ groups are isopropoxide and butoxide. In an embodiment of the invention the titanium species has the formula: $TiCl_n(OR^1)_m$, wherein n is from 2 to 4, n+m=4, and the $OR^1$ group taken as a whole is selected from an alkoxy group, an aryloxy group, or mixtures thereof.

In an embodiment of the invention the titanium species is titanium tetrachloride.

The titanium species may be added neat or as a solution or suspension in a suitable solvent or diluent. The titanium species may be added to the second product mixture, or the second product mixture may be added to the titanium species. Alternatively, the titanium species may be combined with the second product mixture in simultaneous manner.

In an embodiment, the amount of tetravalent titanium species combined with the second product mixture is such that the molar ratio of total magnesium Mg to titanium Ti will be from about 3:1 to about 15:1. In another embodiment, the molar ratio of total magnesium to titanium will be from about 5:1 to about 10:1.

The third product mixture comprises "procatalytic" materials, in that they must be further treated with an activator to become active for the polymerization of olefins.

In an embodiment of the invention, Step 3 is carried out in-line and upstream of a polymerization zone. In another embodiment, Step 3 is carried out in-line and within a polymerization zone. In yet another embodiment, Step 3 is carried out off-line, and a final product mixture is obtained, from which procatalytic solids may or may not be further isolated.

In embodiment of the invention, the third product mixture obtained in Step 3 is used directly in Step 4 and without isolating any of the solids present.

In an alternate embodiment, the solids present in the third product mixture are isolated using methods well known to persons skilled in the art such as for example filtration or decanting, and they may be subjected to further washing stages. Such isolated solids are "procatalytic" materials, in that they must be further treated with an activator to become active for the polymerization of olefins. Once isolated, the procatalytic solids may be used directly in Step 4, but more conveniently, the solids are re-slurried in a suitable diluent prior to carrying out Step 4.

Step 4:

An active polymerization catalyst is obtained by either i) combining said third product mixture with an activator; or ii) combining solids isolated from said third product mixture with an activator.

The activator may be an aluminoxane compound or an organoaluminum compound. In a particular embodiment of the invention the activator is an organoaluminum compound.

In an embodiment of the invention, the activator is added as a solution in hydrocarbon solvent and is added to the third product mixture, although reverse or simultaneous combinations of the activator and the third product mixture are also contemplated by the present invention.

In another embodiment the activator is added as a solution in hydrocarbon solvent and is added to re-slurried solids isolated from said third product mixture.

In an embodiment of the invention, Step 4 is carried out in-line and upstream of a polymerization zone. In another embodiment, Step 4 is carried out in-line and within a polymerization zone. In yet another embodiment, Step 4 is carried out off-line, and a final product mixture is obtained, from which solids may or may not be further isolated and optionally washed.

The aluminoxane may be of the formula:

$$(R^2)_2AlO(R^2AlO)_mAl(R^2)_2$$

wherein each $R^2$ is independently selected from the group consisting of $C_{1-20}$ hydrocarbyl radicals and m is from 0 to 50, preferably $R^2$ is a $C_{1-4}$ alkyl radical and m is from 5 to 30. Methylaluminoxane (or "MAO") in which each $R^2$ is methyl is the preferred aluminoxane. Aluminoxanes are well known as cocatalysts (i.e. activators), particularly for metallocene-type catalysts. Aluminoxanes are also readily available articles of commerce.

The use of an aluminoxane cocatalyst generally requires a mole ratio of aluminum to the transition metal in the catalyst from about 3:1 to 500:1. In a particular embodiment, use of aluminoxane as cocatalyst, provides a mole ratio of aluminum to the transition metal in the catalyst of from 6:1 to 100:1. In another specific embodiment, the use of aluminoxane as cocatalyst provides a mole ratio of aluminum to the transition metal in the catalyst of from 6:1 to 25:1

Preferred activators are organoaluminum compounds which are defined by the formula:

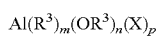

$$Al(R^3)_m(OR^3)_n(X)_p$$

wherein $R^3$ and $R^3$ are each independently $C_1$ to $C_{20}$ hydrocarbyl groups; X is a halide; m+n+p=3; and m≥1.

In an embodiment of the invention, the organoaluminum compound used is defined by the formula:

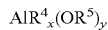

wherein x is from 1 to 3, x+y=3, $R^4$ is a $C_1$ to $C_{10}$ hydrocarbyl group, and $R^5$ is an alkyl or an aryl group.

Particular organoaluminum compounds include triethylaluminum, triisobutyl aluminum and (most preferably) diethyl aluminum ethoxide. When using these organoaluminum activators, preferred Al/Ti ratios are from 0.5/1 to 50/1, based on the moles of Ti in the catalyst. Solution polymerization processes are preferably conducted with a comparatively low Al/Ti mole ratio (preferably 0.5/1 to 5/1, especially 1/1 to 3/1) while gas phase polymerizations are preferably conducted with comparatively high Al/Ti mole ratios (especially 20/1 to 30/1).

The diluents used in the present invention are preferably inert hydrocarbons from which magnesium chloride precipitates as an insoluble solid species and in which both the chloride source and the diorganomagnesium compound are soluble (note: in the present invention the terms "diluent" and "solvent" are used interchangeably and are not meant to connote whether a compound is soluble or insoluble and includes both scenarios). In the present invention, the diluents will be additionally chosen so that any Grignard species formed are at least partially insoluble in the diluents. By partially insoluble, it is meant that at least 10% by weight of any Grignard species formed will precipitate from the diluent.

Diluents used for the catalyst preparation may for example be selected from the following inert hydrocarbons: n-butane, n-hexane, various isomeric hexanes, isooctane, paraffinic mixtures of alkanes having from 8 to 12 carbon atoms, cyclohexane, methylcyclohexane, dimethylcyclohexane, dodecane, industrial solvents composed of saturated or aromatic hydrocarbons such as kerosene, naphthas etc., although non-aromatic diluents are preferred.

Preferably the diluents will be additionally chosen for their compatibility with high temperature solution polymerization processes.

The use of electron donors is well known in the art of magnesium chloride supported titanium based olefin polymerization catalysts. The use of for example, tetrahydrofuran (THF), dimethylformamide, ethyl acetate and methyl isobutyl ketone is well known. Although the optional use of electron donors is contemplated by the current invention, the polymerization catalyst preparation of the present invention preferably does not include the addition of electron donors, especially where the polymerization catalyst prepared is used under solution polymerization conditions.

Polymerization

The catalysts prepared as described above are usefully employed in olefin polymerization processes. Hence olefin polymerization processes using the catalysts prepared according to Steps 1-4 as described above are also part of the current invention.

In an embodiment of the invention, an olefin polymerization process comprises contacting one or more olefins with an olefin polymerization catalyst prepared according to Steps 1-4 as described above.

A more specific embodiment of the current invention is a solution phase polymerization process in which ethylene and optionally at east one comonomer (i.e. an alpha olefin) are contacted with an olefin polymerization catalyst prepared according to Steps 1-4 as described above.

Solution processes for the homopolymerization or copolymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80 to about 300° C. (preferably from about 120 to 250° C.). However, as is illustrated in the Examples, the polymerization temperature for the process of this invention is preferably above 160° C. The upper temperature limit will be influenced by considerations which are well known to those skilled in the art, such as a desire to maximize operating temperature (so as to reduce solution viscosity) while still maintaining good polymer properties (as increased polymerization temperatures generally reduce the molecular weight of the polymer). In general, the upper polymerization temperature will preferably be between 200 and 300° C. (especially 220 to 250° C.). The most preferred reaction process is a "medium pressure process", meaning that the pressure in the reactor is preferably less than about 6,000 psi (about 42,000 kiloPascals or kPa). Preferred pressures are from 10,000 to 40,000 kPa, most preferably from about 2,000 to 3,000 psi (about 14,000-22,000 kPa).

Suitable comonomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment of the invention, the alpha olefin (i.e. comonomer) may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The polyethylene polymers which may be prepared in accordance with the present invention are preferably LLDPE (i.e. linear low density polyethylene) which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc—the so-called very low and ultra low density polyethylenes.

The monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen and other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components can be premixed in the solvent used for the polymerization reaction or can be fed as separate streams to a polymerization reactor. For example, the Steps 1-3 described above can be carried out in-line on route to a polymerization zone while Step 4, the addition of an activator, can occur upstream of a polymerization zone or within the polymerization zone. For in-line catalyst component mixing, in some instances it may be desirable to provide a reaction time for the catalyst components during each combination step. Such "in line mixing" techniques are additionally described in for example U.S. Pat. Nos. 5,589,555 and 6,723,677. Further methods and procedures are described below with reference to specific examples.

EXAMPLES

Chemicals and Reagents

Purchased cyclohexane was dried and deoxygenated by passing it through a bed of deoxygenation catalyst (brand name R311 from BASF), an alumina bed (brand name Selexsorb COS/CD), and a molesieve (3A/13X) bed.

20 wt % Butylethyl Magnesium (BEM) in heptane solution was purchased from Akzo Nobel.

25.1 wt % Triethyl Aluminum (TEAL) in hexane solution was purchased from Akzo Nobel.

25.4 wt % Diethylaluminum Ethoxide (DEAO) in heptane solution was purchased from Akzo Nobel.

A drying reagent with a "built in" dryness indicator (Drierite™) was purchased from Aldrich. The drying reagent was conditioned before use by drying it at 130° C. overnight followed by a secondary overnight drying step at 220° C. in a vacuum oven.

2-chloro-2-methylpropane (tert-butyl chloride or tBuCl) was purchased from Aldrich. The tBuCl was dried by placing it over the pre-dried drying reagent under an inert environment for approximately 16 hours at a ratio of 30 g of dryness indicator per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had a purity above 97% after purification. All glassware used in this procedure was dried in a 120° C. oven overnight.

Ethylene was purchased from Praxair as polymer grade. The ethylene was purified and dried by passing the gas through a series of purification beds including alumina (brand: Selexsorb COS), molesieve (type: 13X), and a deoxygenation bed (brand: Oxiclear®).

Purchased 1-octene was dried by storing a 1-liter batch over molesieve 3A.

Titanium (IV) chloride ($TiCl_4$) was purchased from Aldrich as 99.9% purity packaged under nitrogen.

Methanol was purchased as GR ACS grade from EMD Chemicals.

Analytical Methods

Polymer molecular weights (i.e. weight average molecular weight, Mw) and molecular weight distributions (MWD) were measured by gel permeation chromatography (GPC). The instrument (Waters 150-C) was used at 140° C. in 1,2,4-trichlorobenzene and was calibrated using polyethylene standards.

Polymer branch frequency (branch per 1000 carbons) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Melt index, $I_2$ ("MI") measurements are conducted on the polymers at 190° C. using a 2.16 Kg weight, according to ASTM method D-1238.

Polymer densities, in g/cc were measured using ASTM D-1928.

Some catalyst samples (i.e. as obtained after step 3 or 4) were analyzed for titanium valence distribution. A redox titration method for titanium valence distribution was developed based on a scientific paper (Chien, J. C. et. al, *J. Polym. Sci, Part A: Polym. Chem.* 27, 1989, 1499-1514) and an ultraviolet (UV) method for titanium content analysis was developed based on ASTM standard E878-01.

Mother liquor analysis for chloride, aluminum and magnesium was carried out in some cases after carrying out Step 1 and/or Step 2. The chloride content in the filtrate was determined by precipitation titration with $AgNO_3$ based on principles described by Skoog et al. (D. A. Skoog and D. M. West, Fundamentals of Analytical Chemistry, $4^{th}$ Ed., CBS College Publishing, New York, 1982, Chapter 7, pp 178-194). The contents of aluminum and magnesium were determined by complex formation titration using EDTA as complexing reagent based on principles described by Skoog et al. (D. A. Skoog and D. M. West, Fundamentals of Analytical Chemistry, $4^{th}$ Ed., CBS College Publishing, New York, 1982, Chapter 12, pp 276-303).

Catalyst Synthesis

Off-line Pro-catalyst Preparation.

All the catalysts were prepared using essentially the same laboratory techniques. Table 1 shows the variables in catalyst composition that were studied. All catalysts were made at Mg:Ti (mol/mol)=7.5 with Cl:Mg (mol/mol) at 1.8 for the first tBuCl addition. All glassware was dried overnight in a 130° C. oven. Any supplies that could not be dried in the oven, such as gas tight syringes and septa, were dried overnight under dynamic vacuum in the large antechamber of a glovebox. All glassware and supplies were allowed to cool to room temperature in a glovebox before beginning.

First t-BuCl Addition.

$MgCl_2$/MgClR/$MgR_2$ Stock Solution Preparation.

Inside a glovebox a BEM/TEAL solution 39.592 g of 20.7 wt % BEM and 14.7 g of 19.43 wt % BEM (100 mmol of Mg total, AKZO BEM in heptane supplied at Mg:Al≅50) was weighed into a dropping funnel and diluted with 80 ml of cylclohexane. Into a 3-neck round bottom flask (rbf) was added tBuCl 19.58 ml (180 mmol, molar ratio Cl:Mg=1.8) by gas tight syringe and diluted with 100 ml of cyclohexane. The tBuCl solution was stirred (using an overhead stirrer) at 400 rpm. The rbf was then placed in an oil bath and temperature set to 48° C. A thermocouple wire was inserted through a septum and attached to the rbf ensuring the thermocouple wire was submersed in the reaction mixture to monitor the reaction temperature. When the solution temperature reached 45° C. the BEM solution was added dropwise (over 15 min) to maintain the temperature below 70° C. The white slurry was then stirred for another 30 min and transferred to a glass bottle. The slurry was then diluted to 400 ml (with cyclohexane) and kept as stock solution for the next experiments.

Example 1

Two Step Addition of Chloride

Second tBuCl Addition at Cl:Mg=0.15.

A 100 ml (25 mmol of Mg) aliquot of the Mg stock solution (prepared as above) was transferred into a rbf with a stir bar. To the stirred solution at ambient temperature was quickly added tBuCl 0.408 ml (3.75 mmol, molar ratio of chloride added to total magnesium: Cl:Mg=0.15) resulting in a 4° C. temperature rise. The slurry was stirred for 30 min, after which stirring was stopped and the solid allowed to settle for a few minutes and a small aliquot (~5 g) of the clear solution (using a syringe filter) was taken for soluble Mg species analysis. Stirring was restarted at ambient temperature and $TiCl_4$ 1.5 ml of a 2.24M solution (3.33 mmol, Mg:Ti=7.5) was added quickly resulting in an immediate color change to dark brown and a 5° C. temperature rise. The slurry was then stirred for an additional 30 min, before being transferred into a 200 ml wide-neck glass bottle for storage.

Example 2

Two Step Addition of Chloride

Second tBuCl Addition at Cl:Mg=0.21.

A 100 ml (25 mmol of Mg) aliquot of the Mg stock solution (prepared as above) was transferred into a rbf with a stir bar. To the stirred solution at ambient temperature was quickly added tBuCl 0.571 ml (5.25 mmol, molar ratio of chloride added to total magnesium: Cl:Mg=0.21) resulting in a 6.7° C. temperature rise. The slurry was stirred for 30 min, after which stirring was stopped and the solid allowed to settle for a few minutes and a small aliquot (~5 g) of the clear solution (using a syringe filter) was taken for soluble Mg species analysis. Stirring was restarted at ambient temperature and $TiCl_4$ 1.5 ml of a 2.24M solution (3.33 mmol, Mg:Ti=7.5) was added quickly resulting in an immediate color change to dark brown and a 5° C. temperature rise. The slurry was then stirred for an additional 30 min, before being transferred into a 200 ml wide-neck glass bottle for storage.

Example 3

Two Step Addition of Chloride

Second tBuCl Addition at Cl:Mg=0.27.

A 100 ml (25 mmol of Mg) aliquot of the Mg stock solution (prepared as above) was transferred into a rbf with a stir bar. To the stirred solution at ambient temperature was quickly added tBuCl 0.734 ml (6.75 mmol, molar ratio of chloride added to total magnesium: Cl:Mg=0.27) resulting in a 6.7° C. temperature rise. The slurry was stirred for 30 min, after which stirring was stopped and the solid allowed to settle for a few minutes and a small aliquot (~5 g) of the clear solution (using a syringe filter) was taken for soluble Mg species analysis. Stirring was restarted at ambient temperature and $TiCl_4$ 1.5 ml of a 2.24M solution (3.33 mmol, Mg:Ti=7.5) was added quickly resulting in an immediate color change to dark brown and a 5° C. temperature rise. The slurry was then stirred for an additional 30 min before being transferred into a 200 ml wide-neck glass bottle for storage.

Example 4

Comparative

Single tBuCl Addition Step.

A 100 ml (25 mmol of Mg) aliquot of the Mg stock solution (prepared as above) was filtered (the filtrate was analyzed for soluble Mg species) and washed with cyclohexane (2×20 ml). The white solid was transferred into a rbf with a stir bar using 100 mL cyclohexane. The rbf was placed in an oil bath and heated to 50° C. while stirring. $TiCl_4$ 1.5 ml of a 2.24M solution (3.33 mmol, Mg:Ti=7.5) was added quickly resulting in an immediate color change to dark brown and a 5° C. temperature rise. The slurry was then stirred for an additional 30 min before being transferred into a 200 ml wide-neck glass bottle for storage.

TABLE 1

Catalyst Synthetic Conditions and Procatalyst Properties

| Examples | 1st Cl:Mg Ratio | 2nd Cl:Mg Ratio | Total Cl/ Mg | % Ti(III) of Total Ti | % Ti(II) of Total Ti | % Soluble $Mg^{NOTE\ 1}$ |
|---|---|---|---|---|---|---|
| Example 1 | 1.8 | 0.15 | 1.95 | 43 | 35 | 6.94 |
| Example 2 | 1.8 | 0.21 | 2.01 | 52 | 29 | 5.24 |
| Example 3 | 1.8 | 0.27 | 2.07 | 59 | 20 | 3.41 |
| Example 4 (Comparative) | 1.8 | 0 | 1.8 | 67 | 15 | 10.23 |
| Example 5 (Comparative, Catalyst 1E', as taken from Table 1 of U.S. Pat. No. 7,666,810) | 1.8 | 0 | 1.8 | 70 | 8.5 | N/A |

NOTE [1] The % Mg remaining as soluble Mg (assumed to be $MgR_2$) was measured before addition of Ti and in the case of Example 4, the filtrate was analyzed for soluble Mg species. The absence of chloride bearing species is expected due to the insolubility of magnesium chloride and Grignard species in the solvent used. The insolubility of magnesium chloride and Grignard reagents in analogous solvents was previously established in U.S. Pat. No. 7,666,810; see Table 3. Due to the absence of Cl in the mother liquor (0 mmol Cl was observed in U.S. Pat. No. 7,666,810), the Mg species present were assigned as dialkylmagnesium species.

The active polymerization catalysts were generated by combining a measured amount of the above procatalyst (examples 1-4) with DEAD in a CPU reactor. The procatalysts were used directly and were not isolated as solids. The procatalyst mixture (a slurry of procatalyst) was fed directly to the CPU reactor. Polymerization results are shown below.

Continuous Polymerization

Continuous polymerizations were conducted on a continuous polymerization unit (CPU). The CPU contained a 71.5 mL stirred reactor and was operated between 160-280° C. for the polymerization experiments. An upstream mixing reactor having a 20 mL volume was operated at 5° C. lower than the polymerization reactor. The mixing reactor was used to preheat the ethylene, octene and some of the solvent streams. Catalyst feeds and the rest of the solvent were added directly to the polymerization reactor as a continuous process. A total continuous flow of 27 mL/min into the polymerization reactor was maintained.

The procatalysts made according to examples 1-4 above, along with DEAO were added to the CPU using a slurry delivering system. The slurry delivery system consisted of an inverted, 1000 mL syringe pump with a 3500 mL stirred slurry reservoir. Slurry was transferred from a stirred bottle, via pressure differential, through a stainless steel cannula into the 3500 mL stirred slurry reservoir. The slurry was then diluted in the reservoir to the required concentration with purified cyclohexane. Once the slurry was transferred and diluted, it was stirred in the reservoir for a minimum of 15 minutes before any was transferred into the syringe pump. When the slurry was ready to be transferred to the reactor, an air actuated solenoid valve, which isolated the reservoir from the syringe barrel, was opened allowing slurry flow to the syringe barrel. The syringe barrel was then loaded to the desired volume at a flow of 25 mL/min, with constant stirring in the syringe barrel. When the syringe barrel was filled to the required volume, the solenoid valve to the reservoir was closed, isolating the syringe barrel from the reservoir. The syringe barrel was then brought up to the reactor pressure while still isolated from the reactor. When the syringe barrel has reached the reactor pressure, an air actuated solenoid valve (which isolated the syringe barrel from the reactor) was opened. The syringe pump was then calibrated and programmed to deliver the desired flow rate of slurry.

For the slurry catalyst experiments, copolymers were made at an octene/ethylene weight ratio of 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. Q is ethylene conversation (and determined by an online gas chromatograph (GC)) and polymerization activity Kp is defined as:

$$(Kp)(HUT)=Q((1-Q)(1/\text{catalyst concentration})$$

wherein Q is the fraction of ethylene monomer converted; HUT is a reciprocal space velocity (hold up time) in the polymerization reactor expressed in minutes and maintained constant throughout the experimental program; and the catalyst concentration is the concentration in the polymerization reactor expressed in mmol of Ti per liter. Polymerization performance and polymer property data are show in Table 2.

All polymerization experiments were conducted at 220° C. and polymers were collected at 90%±1 ethylene conversion and the diethyl aluminum ethoxide (DEAO) to Ti molar ratio was between 1.2 to 1.6.

TABLE 2

CPU Polymerization Results

| Examples | Kp (1/mM*min) | Mw (×10$^{-3}$) | MWD | Br/1000 C. |
|---|---|---|---|---|
| Example 1 | 8 | N/A | N/A | N/A |
| Example 2 | 43.3 | 60.6 | 3.23 | 10 |
| Example 3 | 44.2 | 60.3 | 3.12 | 10.1 |
| Example 4 (Comparative) | 29.55 | 81.5 | 3.94 | 8.5 |
| Example 5 (Comparative, Catalyst 1E', as taken from run No. 8, Table 6 of U.S. Pat. No. 7,666,810) | 58.25 | 66.6 | 2.9 | 9.4 |

As can be seen from the above data, the polymerization catalysts prepared according to the present invention (i.e. Examples 1-3, made by using two distinct t-BuCl addition steps) have similar performance for solution phase polymerization at 220° C. as catalysts prepared according to U.S. Pat. No. 7,666,810 (i.e. Example 5) whose preparation requires a time consuming filtration step. In addition, Example 4, which does not involve a second tBuCl addition step provides a catalyst with lower activity (Kp) than those of Example 2 and 3.

Inline Catalyst Preparation and Polymerization

In-line experiments involve continuous flow, solution copolymerization of ethylene and 1-octene at medium pressure at a pilot scale, using a single reactor system and an olefin polymerization catalyst prepared according to the present invention. The reactor was a continuously stirred tank reactor ("CSTR"). The solvent used in these experiments was methyl pentane. The reactor has a volume of 22 liters. The reactor pressure was about 16,000 kPa. The reactor was agitated to ensure good mixing of the reactor contents.

The process was continuous in all feed streams (i.e. solvent, which was methyl pentane; monomers and catalyst components) and in the removal of product. Monomers were purified prior to addition to the reactor using conventional feed preparation systems (such as contact with various absorption media to remove impurities such as water, oxygen and polar contaminants).

Polymerizations were carried out at the pilot plant scale and the catalyst components were combined in-line on route to a polymerization zone. The catalyst components were fed as solutions from holding tanks to a number of inlet points distributed along an inline mixer or common feed line (i.e. a catalyst component reaction tree) which carried in situ formed catalyst product mixtures to the polymerization zone. The temperature and mixing time of the catalyst components fed to the inline mixer could be controlled. The hold up time for the stirred tank polymerization reactor was short and the solution product was continuously withdrawn from the reactor and the resulting polyethylene copolymer was recovered and analyzed.

Catalyst component solution flow rates and concentrations were controlled to provide molar ratios of the components as specified below. The catalyst components used for in-line catalyst preparation were titanium tetrachloride (TiCl$_4$), butyl ethyl magnesium (BEM) (mixed with triethyl aluminum (TEAL) at a molar ratio of 20/1), tertiary butyl chloride (tBuCl), and diethyl aluminum ethoxide (DEAO).

For inventive pilot plant experiments a source of chloride was combined with butylethylmagnesium in two distinct addition steps. The source of chloride used in each distinct addition step (i.e. the first source of chloride and the second source of chloride) was t-butylchloride (t-BuCl). To prepare the catalyst, t-BuCl is combined with n-butylethylmagnesium in a first step. After a first hold up time (HUT1) t-BuCl is added in a second step. After a second hold up time (HUT2) TiCl$_4$ is added in a third step. After a third hold up time (HUT3), the catalyst mixture is flushed with diluent (methylpentane isomers) toward the polymerization reactor. After a fourth hold up time (HUT4), the catalyst mixture enters the reactor where it is combined with DEAO in a fourth step (i.e. a constant flow of DEAo was added directly into the polymerization reactor to activate the procatalyst). In a comparative example, the above was repeated, except that the source of chloride was added to the butylethylmagnesium in a single addition step. Table 3 shows the details for the catalyst component reaction tree set up and the conditions used.

TABLE 3

In-Line Mixer (i.e. Catalyst Component Tree) Set Up and Conditions

| Description of the Inline Mixer Section | Hold up time in secs Example 6 | Hold up time in secs Example 7 (Comparative) | Temperature in ° C. Example 6 | Temperature in ° C. Example 7 (Comparative) |
|---|---|---|---|---|
| Section 1 (HUT1) from the point of BEM and first tBuCl mixing to the point of the second tBuCl addition | 5.9 | 6.0 Note: entire amount of t-BuCl is added | 59.9 | 57.6 |
| Section 2 (HUT2) from the point of second tBuCl addition to the point of the TiCl4 addition | 16.3 | 24.1 Note: there is no second addition of tBuCl | 59.9 | 57.6 |
| Section 3 (HUT3) From the point of TiCl$_4$ addition to the point of solvent flush | 11.0 | 14.0 | 59.4 | 53.6 |
| Section 4 (HUT4) From the point of solvent flush to the reactor entrance | 3.1 | 3.1 | 37.4 | 35.8 |

The BEM concentration in section 1 for the inventive Example 6 was 12.01 mmol/L and the comparative Example 7 was 10.62 mmol/L. The procatalyst and DEAO were pumped into the reactor together with the methylpentanes solvent (diluents). The catalyst flow rate had an aim point as shown in the Table 4 and was adjusted to maintain total ethylene conversions around 90%. The additive used after the polymerization was Irgaphos 168 (500 ppm) for both of Examples 6 and 7.

TABLE 4

Polymerization Process Conditions and Polymer Properties

|  | Example 6 | Example 7 (Comparative) |
|---|---|---|
| Key process parameters |  |  |
| Total flow (kg/hr) | 650.2 | 649.8 |
| Ethylene (wt %) | 14.3 | 13.7 |
| Octene/ethylene (wt/wt) | 0.65 | 0.65 |
| Hydrogen (ppm) | 1.06 | 1.00 |
| First tBuCl to BEM ratio (mol/mol) | 1.94 (98.7 mol % of total Cl is added in Step 1) | 1.95 |
| Total tBuCl to BEM ratio (mol/mol) | 1.965 (1.3 mol % of total Cl is added in Step 2) | 1.95 |
| Mg to Ti ratio (mol/mol) | 7.2 | 7.2 |
| DEAO to Ti ratio (mol/mol) | 1.80 | 1.36 |
| Reactor temperature (° C.) | 203.0 | 197.4 |
| Ethylene conversion (%) | 89.1 | 89.5 |
| Total TiCl4 (ppm) | 5.20 | 4.51 |
| Polymer properties |  |  |
| Density (g/cm3) | 0.9209 | 0.9196 |
| MI (I2) | 1.38 | 0.91 |
| Mw (10$^{-3}$) | 99.87 | 102.87 |
| Mw/Mn | 3.71 | 3.33 |
| Br/1000 C. | 9.70 | 10.10 |

As shown in Table 4, a catalyst prepared according to the present invention (i.e. with two distinct additions of t-BuCl) can be used to make polyethylene copolymer at higher temperatures (i.e. 203.0° C.) than a catalyst prepared using a single t-BuCl addition step (i.e. 197.4° C.). Higher temperatures are desirable due to improved production efficiencies, particularly when recovering solvent used in the polymerization process. Furthermore, the inventive catalysts provide polyethylene copolymer at high temperature without significantly lowering the polymer weight average molecular weight (Mw).

INDUSTRIAL APPLICABILITY

This invention provides catalysts and processes suitable for solution phase olefin polymerization. Solution phase polymerization processes provide commercially important thermoplastic materials. For example, ethylene copolymers can be made using a high temperature solution phase polymerization process. Ethylene copolymer plastics have many applications such as use in stretch wrap film, packaging film and in various molded goods.

The invention claimed is:

1. A process to prepare an olefin polymerization catalyst, said process comprising:
   (a) in a diluent, combining a diorganomagnesium compound of the formula MgRaRb with a first source of chloride to give a first product mixture, wherein the molar ratio of chloride in said first source of chloride to magnesium Mg is from 1.5:1 to 1.95:1 and where Ra and Rb are individually $C_1$ to $C_8$ hydrocarbyl groups;
   (b) without isolating any solids present in said first product mixture, combining said first product mixture with a second source of chloride to give a second product mixture, wherein the molar ratio of chloride in said second source of chloride to total magnesium Mg is from 0.01:1 to 0.7:1;
   wherein the total molar ratio of chloride from said first source of chloride and from said second source of chloride to magnesium Mg does not exceed a ratio of 2.2:1;
   (c) without isolating any solids present in said second product mixture, combining said second product mixture with a titanium species to give a third product mixture, said titanium species having the formula $TiCl_n(OR)_m$, wherein n is from 2 to 4, n+m=4 and OR is selected from an alkoxy group, an aryloxy group, or mixtures thereof; and (d) i) combining said third product mixture with an activator; or
  ii) combining solids isolated from said third product mixture with an activator;
wherein the first source of chloride and the second source of chloride are each chosen from an organic chloride compound or HCl.

2. The process of claim 1 wherein the total molar ratio of chloride from said first source of chloride and from said second source of chloride to magnesium Mg does not exceed a ratio of 2.1:1.

3. The process of claim 1 wherein the molar ratio of chloride in said first source of chloride to magnesium Mg is from 1.65:1 to 1.95:1.

4. The process of claim 3 wherein the molar ratio of chloride in said second source of chloride to total magnesium Mg is from 0.015:1 to 0.4:1.

5. The process of claim 1, with the proviso that electron donors are not added.

6. The process of claim 1 wherein the molar ratio of Mg:Ti is from 3:1 to 15:1.

7. The process of claim 1 wherein said titanium species is $TiCl_4$.

8. The process of claim 1 wherein said activator has the formula $AlR^4_x(OR^5)_y$, wherein x is from 1 to 3, x+y=3, $R^4$ is a $C_1$ to $C_{10}$ hydrocarbyl group and $R^5$ is an alkyl or an aryl group.

9. The process of claim 8 wherein the molar ratio Al:Ti is from 0.5:1 to 50:1.

10. A process to prepare an olefin polymerization catalyst, said process comprising:
  (a) in a diluent, combining a diorganomagnesium compound of the formula MgRaRb with a first source of chloride to give a first product mixture, wherein the molar ratio of chloride in said first source of chloride to magnesium Mg is from 1.5:1 to 1.95:1 and where Ra and Rb are individually $C_1$ to $C_8$ hydrocarbyl groups;
  (b) without isolating any solids present in said first product mixture, combining said first product mixture with a second source of chloride to give a second product mixture, wherein the molar ratio of chloride in said second source of chloride to total magnesium Mg is from 0.01:1 to 0.7:1;
  wherein the total molar ratio of chloride from said first source of chloride and from said second source of chloride to magnesium Mg does not exceed a ratio of 2.2:1;
  (c) without isolating any solids present in said second product mixture, combining said second product mixture with a titanium species to give a third product mixture, said titanium species having the formula $TiCl_n(OR)_m$, wherein n is from 2 to 4, n+m=4 and OR is selected from an alkoxy group, an aryloxy group, or mixtures thereof; and
  (d) i) combining said third product mixture with an activator; or
    ii) combining solids isolated from said third product mixture with an activator;
  wherein the first source of chloride and the second source of chloride are non-metallic chloride compounds;
  wherein said first source of chloride and said second source of chloride are the same compound.

11. An olefin polymerization process comprising contacting one or more olefins with the olefin polymerization catalyst prepared according to the process of claim 1.

12. A solution phase polymerization process in which ethylene and at least one comonomer are contacted with the olefin polymerization catalyst prepared according to the process of claim 1.

13. A solution phase polymerization process catalyzed by an olefin polymerization catalyst, said catalyst being prepared in-line by a process comprising:
  (a) forming a first product mixture by combining a diorganomagnesium compound and a first source of chloride, in a diluent, wherein the molar ratio of chloride in said first source of chloride to said diorganomagnesium compound is from 1.5:1 to 1.95:1;
  (b) forming a second product mixture by combining said first product mixture with a second source of chloride, wherein the molar ratio of chloride in said second source of chloride to said diorganomagnesium compound is from 0.01:1 to 0.7:1;
  provided that the total molar ratio of chloride from said first source of chloride and from said second source of chloride to magnesium Mg does not exceed a ratio of 2.2:1;
  (c) forming a third product mixture by combining said second product mixture with a titanium species of the formula $TiCl_n(OR)_m$, wherein n is from 2 to 4, n+m=4 and OR is selected from an alkoxy group, an aryloxy group, or mixtures thereof;
  (d) combining said third product mixture with an activator.

14. The process of claim 13 wherein (a)-(c) are carried out upstream of a polymerization zone.

15. The process of claim 13 wherein (a)-(d) are carried out upstream of a polymerization zone.

16. The process of claim 13 wherein the total molar ratio of chloride from said first source of chloride and from said second source of chloride to magnesium Mg does not exceed a ratio of 2.1:1.

17. The process of claim 13 wherein the molar ratio of chloride in said first source of chloride to magnesium Mg is from 1.65:1 to 1.95:1.

18. The process of claim 17 wherein the molar ratio of chloride in said second source of chloride to total magnesium Mg is from 0.015:1 to 0.4:1.

19. The process of claim 13 with the proviso that electron donors are not added.

20. The process of claim 13 wherein the molar ratio of Mg:Ti is from 3:1 to 15:1.

21. The process of claim 13 wherein said titanium species is $TiCl_4$.

22. The process of claim 13 wherein said activator has the formula $AlR^4_x(OR^5)_y$, wherein x is from 1 to 3, x+y=3, $R^4$ is a $C_1$ to $C_{10}$ hydrocarbyl group and $R^5$ is an alkyl or an aryl group.

23. The process of claim 22 wherein the molar ratio Al:Ti is from 0.5:1 to 50:1.

24. The process of claim 13 wherein said first source of chloride and said second source of chloride are the same compound.

25. The process of claim 13 wherein said diorganomagnesium compound has the formula MgRaRb, wherein Ra and Rb are individually $C_1$ to $C_8$ hydrocarbyl groups.

26. A process to prepare an olefin polymerization catalyst, said process comprising:
  (a) forming a solid product by combining in a diluent, a diorganomagnesium compound of the formula MgRaRb with a source of chloride wherein the molar ratio of chloride provided by said source of chloride to magne sium Mg is from 1.55:1 to 2.2:1 and where Ra and Rb are individually $C_1$ to $C_8$ hydrocarbyl groups; wherein
  i) from 70 to 99.5 mol % of said source of chloride is combined with MgRaRb in a first contacting stage; and
  ii) the balance of said source of chloride is combined with MgRaRb in a second contacting stage;
  provided that the molar ratio of chloride provided by said source of chloride to magnesium Mg in said first contacting stage does not exceed 2:1;
(b) without isolating said solid product, adding a titanium species, said titanium species having the formula $TiCl_n(OR)_m$, wherein n is from 2 to 4, n+m=4 and OR is selected from an alkoxy group, an aryloxy group, or mixtures thereof; and
(c) adding an activator;
wherein the source of chloride is a non-metallic chloride compound.

27. The process according to claim 26, wherein from 75 to 90 mol % of said source of chloride is combined with MgRaRb in a first contacting stage and the balance of said source of chloride is combined with MgRaRb in a second contacting stage.

\* \* \* \* \*